US008731991B2

(12) United States Patent  
Altuwaijri et al.

(10) Patent No.: US 8,731,991 B2  
(45) Date of Patent: May 20, 2014

(54) SYSTEM AND METHOD OF INFORMATION TECHNOLOGY APPLICATION DEPLOYMENT

(75) Inventors: Majid Altuwaijri, Riyadh (SA); Mohammad S. Khorsheed, Riyadh (SA)

(73) Assignee: King Abdulaziz City for Science and Technology, Riyadh (SA)

( * ) Notice: Subject to any disclaimer, the term of this patent is extended or adjusted under 35 U.S.C. 154(b) by 24 days.

(21) Appl. No.: 12/823,389

(22) Filed: Jun. 25, 2010

(65) Prior Publication Data

US 2011/0320236 A1     Dec. 29, 2011

(51) Int. Cl.
  *G06Q 10/00* (2012.01)
  *G06Q 10/06* (2012.01)
  *G06Q 10/10* (2012.01)

(52) U.S. Cl.
  CPC ........ *G06Q 10/06313* (2013.01); *G06Q 10/103* (2013.01)
  USPC .......................................... 705/7.23; 705/301

(58) Field of Classification Search
  CPC ..................... G06Q 10/06313; G06Q 10/103
  USPC ................................................. 705/7.23, 301
  See application file for complete search history.

(56) References Cited

U.S. PATENT DOCUMENTS

| | | | |
|---|---|---|---|
| 2002/0059512 A1 | 5/2002 | Desjardins | |
| 2004/0073886 A1 | 4/2004 | Irani | |
| 2004/0143477 A1* | 7/2004 | Wolff | 705/9 |
| 2005/0278202 A1* | 12/2005 | Broomhall et al. | 705/7 |
| 2008/0133259 A1* | 6/2008 | O'Connor et al. | 705/1 |

FOREIGN PATENT DOCUMENTS

| | | |
|---|---|---|
| JP | 2001-344104 A | 12/2001 |
| JP | 2003-303213 A | 10/2003 |
| JP | 2003-316934 A | 11/2003 |
| JP | 2006-163962 A | 6/2006 |
| JP | 2008-052700 A | 3/2008 |

OTHER PUBLICATIONS

Kwan Yew Wong, "Critical success factors for implementing knowledge management in small and medium enterprises", 2005, Industrial Management & Data Systems, vol. 105, Issue 3. Abstract.*

(Continued)

*Primary Examiner* — Justin M Pats
*Assistant Examiner* — Amanda Gurski
(74) *Attorney, Agent, or Firm* — Andrew M. Calderon; Roberts Mlotkowski Safran & Cole, P.C.

(57) ABSTRACT

The invention generally relates to IT, and more particularly, to a method and system to achieve project-based diffusion of IT innovations. In accordance with aspects of the invention, the system comprises three integrated components. The first component is directed to the project management stages taken by an organization to deploy new technology innovations. This in turn consists of four stages: visioning, matching vision, deployment, and evaluation and improvement. The second component is directed to knowledge barriers to IT innovation diffusion. The third component is directed to critical success factors (CSF) of IT innovation implementations. In one embodiment the system includes of a Program Management Module (PMM) to implement corporate strategy for project management and to transform the organization into a learning one. In further embodiments, system is explained in detail using an example of ERP implementation. In this manner, implementations of the invention may be used to manage the lifecycle of IT innovation deployment using knowledge from other projects as well as knowledge fed back into the lifecycle.

27 Claims, 6 Drawing Sheets

(56) References Cited

OTHER PUBLICATIONS

Japan Office Action dated Dec. 4, 2012 in Application No. 2011-113538, 5 pages.
Fujita, S., "ERP Installation/Utilization Practice Guide, ver. 2009-10, the first edition", Nikkei BP corp., Aug. 10, 2009, 17 pages.
Okamura, M. et al., "Encyclopedia of Risk Management, Lead IT Project to Success, version 1", Nikkei BP corp., Mar. 31, 2008, 29 pages.
Decision of Rejection dated Jun. 11, 2013 in JP Application No. 2011-113538, 6 pages.
Kwan Yew Wong (2005), "Critical success factors for implementing knowledge management in small and medium enterprises", Industrial Management & Data Systems, vol. 105, Issue 3. Abstract. URL: http://www.emeraldinsight.com/journals.htm?articleid=1463424&show=abstract.

* cited by examiner

SYSTEM AND METHOD OF INFORMATION TECHNOLOGY APPLICATION DEPLOYMENT

FIELD OF THE INVENTION

The present invention generally relates to a system and method for information technology (IT) application deployment, and more particularly, to a system and method to manage a deployment project of an IT solution.

BACKGROUND

Enterprise-wide daily transactions are difficult to manage due to their complexity and scope in terms of rendering services to their clients. As a result, many organizations employ Information Technology (IT) to manage their enterprise-wide transactions and to ensure quality of services. IT, when properly selected and implemented, helps organizations increase their efficiency and capabilities which improves the organization's competitive advantages.

Information systems (IS) are defined as IT systems that combine computer hardware, communication technology, and specialized software designed in order to handle the information related to business processes within an organization or across multiple organizations. Information systems are usually used to coordinate the work of different organizational functions, from back office administration support, to organization strategic core systems.

In spite of the importance of IT/IS to organizations, the implementation of large information systems is still considered as a complex and risky exercise which leads to several problems concerning budgets, quality, and time schedules. In fact, studies have found that IS project failures are very common. For example, some IS projects fail as a result of poor knowledge management, poor project management, inadequate reuse of past experiences and lessons learned, and/or insufficient understanding of the technology and its limitation. Other reasons might include the lack of consistency in management, the lack of formal tracking, and the lack of functional user involvement. Moreover, some organizations lack the methods, skills, and tools required for selecting the right portfolio of IT projects that match the vision of the organization. In fact, some organizations tend to repeat the same mistakes too often, particularly in terms of knowledge transfer from past projects.

One example of an IT project application to be deployed is an Enterprise Resource Planning ("ERP") application. ERP is an industry term for integrated, multi-module application software packages that are designed to serve and support multiple business functions. An ERP system can include software for manufacturing, order entry, accounts receivable and payable, general ledger, purchasing, warehousing, transportation and human resources. Evolving out of the manufacturing industry, ERP implies the use of packaged software rather than proprietary software written by or for one customer. ERP modules may be able to interface with an organization's own software with varying degrees of effort, and, depending on the software, ERP modules may be alterable via the vendor's proprietary tools as well as proprietary or standard programming languages.

ERP systems are typically integrated software applications that perform business functions such as accounting, production scheduling, customer information management, human capital management, etc. They are frequently implemented on servers and simultaneously provide services to a large number of users, typically over a computer network. These systems are in contrast to the more common single-user software applications which run on a user's own local computer and serve only one user at a time. Typically, the ERP systems are implemented as a group of software modules sharing a common database. Examples of a ERP systems include a Customer Relations Management ("CRM") system and a Manufacturing Resource Planning ("MRP") system.

Accordingly, there exists a need in the art to overcome the deficiencies and limitations described herein above.

SUMMARY

In a first aspect of the invention, there is a method implemented in a computer infrastructure having computer executable code tangibly embodied on a computer readable storage medium having programming instructions operable to determine a set of critical success factors (CSFs) relevant a project using data from a project management knowledge base, determine a set of knowledge barriers relevant to the project using data from the project management knowledge base, automatically select and aggregate a subset of CSFs and knowledge barriers relevant to a current project based on a comparison of the subset of CSFs and knowledge barriers to the current project, generate a project management report for the current project including the subset of CSFs and knowledge barriers that are relevant to the current project, and output the project management report to a user during a lifecycle of the project. In embodiments, the CSFs and knowledge barriers are provided to the user in a feedback loop. Also in embodiments, the method may include managing the lifecycle of the project, wherein managing the lifecycle of the project includes matching an IT solution to an organizational vision, deploying the IT solution, and evaluating the deployment and recording suggested improvements. Managing the lifecycle of the project may further include recording evaluation data in a knowledge base to inform CSFs and knowledge barriers for a future project. In embodiments, the project may be an Enterprise Resource Planning (ERP) application deployment project.

In another aspect of the invention, there is a computer program product comprising a computer usable storage medium having readable program code embodied in the storage medium, the program code when executed on a computing device causes the computing device to accept as an input a set of critical success factors (CSFs) relevant to an information technology (IT) solution deployment using data from a knowledge base, accept as an input a set of knowledge barriers relevant to the IT solution deployment using data from a knowledge base, automatically select and aggregate a subset of CSFs and knowledge barriers based on a comparison of the subset of CSFs and knowledge barriers to the IT solution deployment, generate a project management report for the IT solution deployment including the subset of CSFs and knowledge barriers that are relevant to the IT solution deployment, and output the project management report to a user during a lifecycle of the IT solution deployment. In embodiments, the CSFs and knowledge barriers are provided to the user in a feedback loop. Some embodiment may further comprise managing the lifecycle of the IT solution deployment, wherein managing the lifecycle of the IT solution deployment may further include matching an IT solution to an organizational vision, deploying the IT solution, evaluating the deployment and recording suggested improvements, and recording evaluation data in a knowledge base to inform CSFs and knowledge barriers for a future project. In embodiments, the IT solution deployment may be an ERP application deployment project.

In yet another aspect of the invention, there is a computer system for providing a project management program, the system comprising a processor, a computer readable memory, and a computer readable storage media, first program instructions to elicit from a user a set of critical success factors (CSFs) relevant to a project and record the CSFs in a project management knowledge base, second program instructions to elicit from a user a set of knowledge barriers relevant to the project using data and record the knowledge barriers in project management knowledge base, third program instructions to automatically select and aggregate a subset of CSFs and knowledge barriers relevant to a current project based on a comparison of the subset of CSFs and knowledge barriers to the current project, fourth program instructions to generate a project management report including the subset of CSFs and knowledge barriers that are relevant to the current project, and fifth program instructions to output the project management report to a user during a lifecycle of the current project, wherein the project management knowledge base comprises data entered during at least one previous project, wherein the first, second, and third program instructions are stored on the computer readable storage media for execution by the processor via the computer readable memory. In embodiments, the lifecycle of the project may include matching an IT solution to an organizational vision, deploying the IT solution, and evaluating and improving the IT solution. The lifecycle of the project may further include updating a knowledge base to inform CSFs and knowledge barriers of a future project.

BRIEF DESCRIPTION OF THE SEVERAL VIEWS OF THE DRAWINGS

The present invention is described in the detailed description which follows, in reference to the noted plurality of drawings by way of non-limiting examples of exemplary embodiments of the present invention.

DETAILED DESCRIPTION

The present invention generally relates to a system and method for information technology (IT) application deployment, and more particularly, to a system and method to manage a deployment project of an IT solution. More specifically, the present invention relates to a method and system to achieve project-based diffusion of IT innovations. Advantageously, the system and method of the present invention manifests the strategic alignment of projects which bear on the synergy created by the management of relations between projects, and the ability to develop a better understanding of the challenges faced in carrying out information systems projects, the factors for success, and the strategies required to take advantage of IT. The acts of sharing will impact on the organization as it is made available to other projects. Such knowledge base will help these organizations refine their strategies and prioritized plans.

In accordance with aspects of the invention, the system comprises several integrated components. For example, the system includes a component directed to project management stages taken by an organization to deploy new technology innovations. This, in turn, includes several stages which may include, for example: visioning, matching vision, deployment, and evaluation and improvement. Another component of the system is directed to knowledge barriers to IT innovation diffusion, and a further component is directed to critical success factors (CSF) of IT innovation implementations.

In embodiments, the system and method of the present invention may also include a Program Management Module (PMM) to implement corporate strategy for project management and to transform the organization into a learning organization. In further embodiments, the system and method may be implemented using an example of enterprise resource planning (ERP) implementation. In this manner, implementations of the invention may be used to manage the lifecycle of IT innovation deployment using knowledge from other projects as well as knowledge fed back into the lifecycle.

System Environment

As will be appreciated by one skilled in the art, the present invention may be embodied as a system, method or computer program product. Accordingly, the present invention may take the form of an entirely hardware embodiment, an entirely software embodiment or an embodiment combining software and hardware. Furthermore, the present invention may take the form of a computer program product embodied in any tangible storage medium of expression having computer-usable program code embodied in the medium.

Any combination of one or more computer usable or computer readable storage medium(s) may be utilized. The computer-usable or computer-readable medium may be, for example, but not limited to, an electronic, magnetic, optical, electromagnetic, infrared, or semiconductor system, apparatus, device, or propagation medium. A computer-usable or computer-readable medium may also be any medium that can contain, store, communicate, propagate, or transport the program for use by or in connection with the instruction execution system, apparatus, or device. The computer usable program code may be transmitted using any appropriate medium, including but not limited to wireless, wireline, optical fiber cable, RF, etc.

The program code may execute entirely on the user's computer or on any combination of computers, such as on a remote computer. The remote computer may be connected to the user's computer through any type of network. This may include, for example, a local area network (LAN) or a wide area network (WAN), or the connection may be made to an external computer (for example, through the Internet using an Internet Service Provider).

Figure 1:
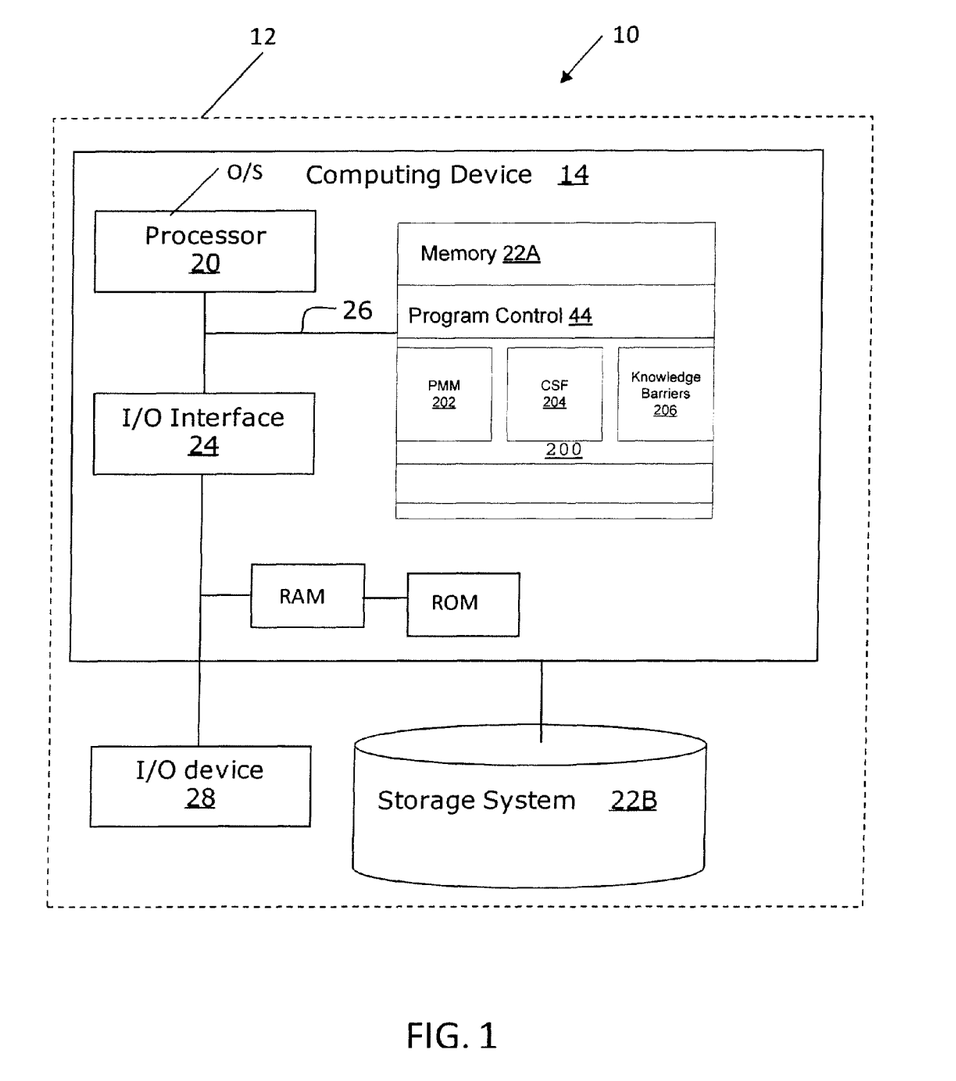
FIG. 1 shows an illustrative environment for implementing the steps in accordance with aspects of the invention.

FIG. 1 shows an illustrative environment 10 for managing the processes in accordance with the invention. The environment 10 includes a server or other computing system 12 that can perform the processes described herein. In particular, the server 12 includes a computing device 14. The computing device 14 can be resident on a network infrastructure or computing device of a third party service provider (any of which is generally represented in FIG. 1).

The computing device 14 also includes a processor 20, memory 22A, an I/O interface 24, and a bus 26. The memory 22A can include local memory employed during actual execution of program code, bulk storage, and cache memories. In addition, the computing device includes random access memory (RAM), a read-only memory (ROM), and an operating system (O/S).

The computing device 14 is in communication with the external I/O device/resource 28 and the storage system 22B. For example, the I/O device 28 can comprise any device that enables an individual to interact with the computing device 14 or any device that enables the computing device 14 to communicate with one or more other computing devices using any type of communications link. The external I/O device/resource 28 may be for example, a handheld device, PDA, handset, keyboard etc.

In general, the processor 20 executes computer program code (e.g., program control 44), which can be stored in the memory 22A and/or storage system 22B. Moreover, in accordance with aspects of the invention, a program control 44 controls a project management system 200. The project management system 200 includes a project management module (PMM) 202, CSF component 204 and knowledge barriers component 206. In embodiments, the project management module (PMM) 202 manages an IT project deployment, described in greater detail herein. For example, the PMM 202 assists a user or group of users in managing the deployment of an IT project, allowing them to take advantage of the synergy of previously managed IT projects. In interaction with the PMM 202, program control 44 further controls a CSF component 204, which apprises the user of the critical milestones in completing the implementation of the IT project, and a knowledge barriers component 206, which apprises the user of the potential issues that should be considered while implementing the IT project. While executing the computer program code, the processor 20 can read and/or write data to/from memory 22A, storage system 22B, and/or I/O interface 24. The program code executes the processes of the invention. The bus 26 provides a communications link between each of the components in the computing device 14.

The computing device 14 can comprise any general purpose computing article of manufacture capable of executing computer program code installed thereon (e.g., a personal computer, server, etc.). However, it is understood that the computing device 14 is only representative of various possible equivalent-computing devices that may perform the processes described herein. To this extent, in embodiments, the functionality provided by the computing device 14 can be implemented by a computing article of manufacture that includes any combination of general and/or specific purpose hardware and/or computer program code. In each embodiment, the program code and hardware can be created using standard programming and engineering techniques, respectively.

Similarly, the computing infrastructure 12 is only illustrative of various types of computer infrastructures for implementing the invention. For example, in embodiments, the server 12 comprises two or more computing devices (e.g., a server cluster) that communicate over any type of communications link, such as a network, a shared memory, or the like, to perform the process described herein. Further, while performing the processes described herein, one or more computing devices on the server 12 can communicate with one or more other computing devices external to the server 12 using any type of communications link.

Management System

Figure 2:
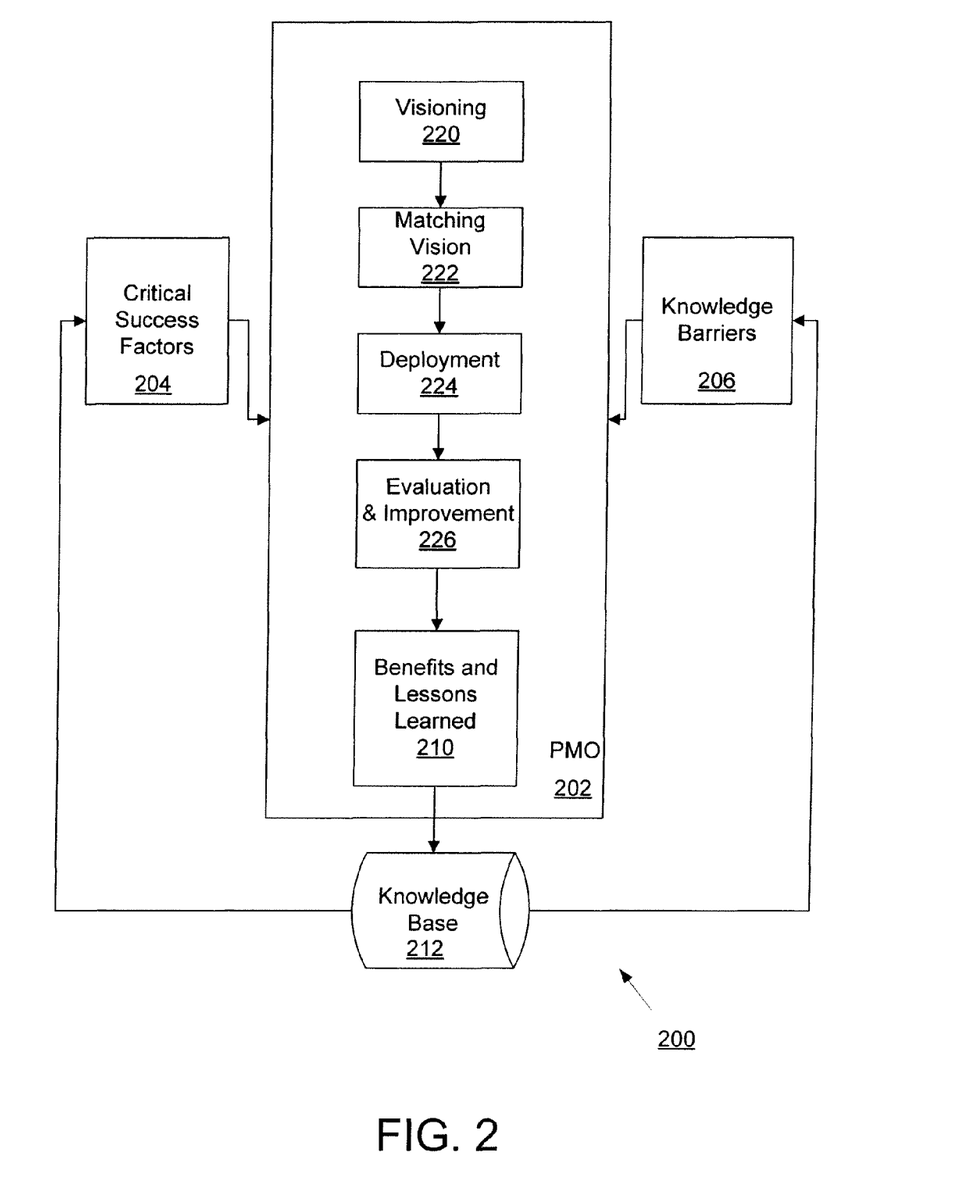
FIG. 2 shows an exemplary depiction of a high level component architecture in accordance with aspects of the invention.

FIG. 2 shows an IT project management system 200, which can be implemented in environment 10. The project management system 200 facilitates strategic alignment of projects and the synergy created by the management of relations between projects, as well as the ability to develop a better understanding of the challenges faced in carrying out information systems projects, the factors for success, and the strategies required to take advantage of IT. By making information about past projects available to current and future projects, the project management system 200 provides users with advantages when beginning new projects. Organizations can now be aware of the repeated knowledge barriers to innovation adoption and can be informed of a well defined plan to address these barriers.

Specifically, FIG. 2 shows project management system 200 with several components, including a project management module (PMM) 202, Critical Success Factors (CSF) component 204, knowledge barriers component 206, and knowledge base database 212. The PMM 202 includes organizational visioning module 220, matching vision module 222, deployment module 224, evaluation and improvement module 226, and benefits and lessons learned module 210.

In embodiments, the PMM 202 is configured to help manage steps taken by an organization to deploy a new technology innovation, and is operated by a project management office (PMO) responsible for overseeing IT deployment projects. In embodiments, the stages can comprise, for example, at least a stage of visioning, a stage of matching a vision, a stage of deployment, and a stage of evaluation and improvement. The visioning module 220 assists a visioning stage to define the organizational mission, objectives, and strategy. This visioning stage may also be concerned with identifying and prioritizing the organizational problems and opportunities that form the basis of the need to acquire the IT solution. These steps are facilitated by the visioning module 220. For this reason, a matching visions stage is directed to finding a fit between a need identified in the visioning stage and a proposed innovation.

A matching vision module 222 assists in a matching vision stage to match an IT solution to an organizational goal. In the matching visions stage it is determined whether the innovation will solve (or partially solve) a problem identified in the first visioning stage. These steps are facilitated by the matching vision module 222. At the end of matching vision stage, the organization decides whether or not to approve the innovation project.

In the event of the project approval, the deployment stage of the process begins. The deployment module 224 assists the user in making a deployment decision. The deployment stage includes decisions and actions related to the deployment of the innovation. The deployment stage also includes, for example, the assimilation and the integration of the innovation within the organization. At the end of the deployment phase, the IT innovation solution is deployed within the organization. These steps are facilitated by the deployment module 224.

Evaluating the performance of the deployment is useful in ensuring the quality of the innovation deployment. Evaluation and improvement module 226 assists the user by emphasizing process flow optimization and continuous expansion of the system to gain competitive advantage.

The CSF component 204 manages CSFs of IT innovation deployment, which are described in greater detail below. The knowledge barriers component 206 manages knowledge barriers to IT innovation diffusion, which are described in greater detail below. Benefits and lessons learned module 210 assists the user in recording benefits and lessons learned from the successful deployment of the IT innovation. The benefits and lessons learned module 210 feeds the knowledge base 212 which, in turn, feeds the PMM 202, the CSF component 204, and the knowledge barriers component 206. This knowledge sharing behavior facilitates learning among the project team members and enables them to resolve problems similar to situations encountered by others in the past, thus enabling more successful projects. The functions of the aforementioned are described in greater detail below.

Flow Diagrams

Figure 3A:
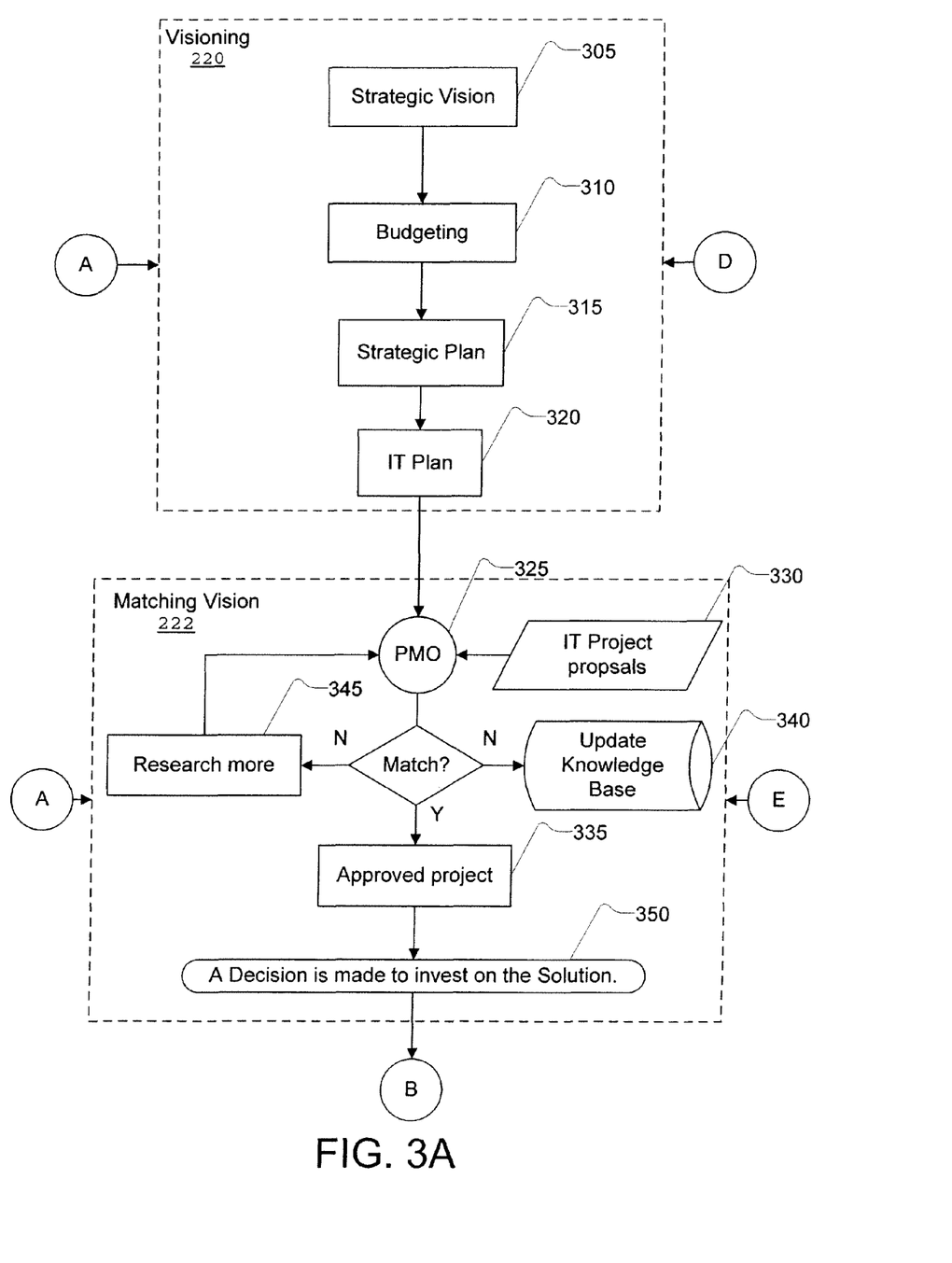
FIGS. 3A and 3B illustrate a high level flow in accordance with aspects of the invention.
Figure 3B:
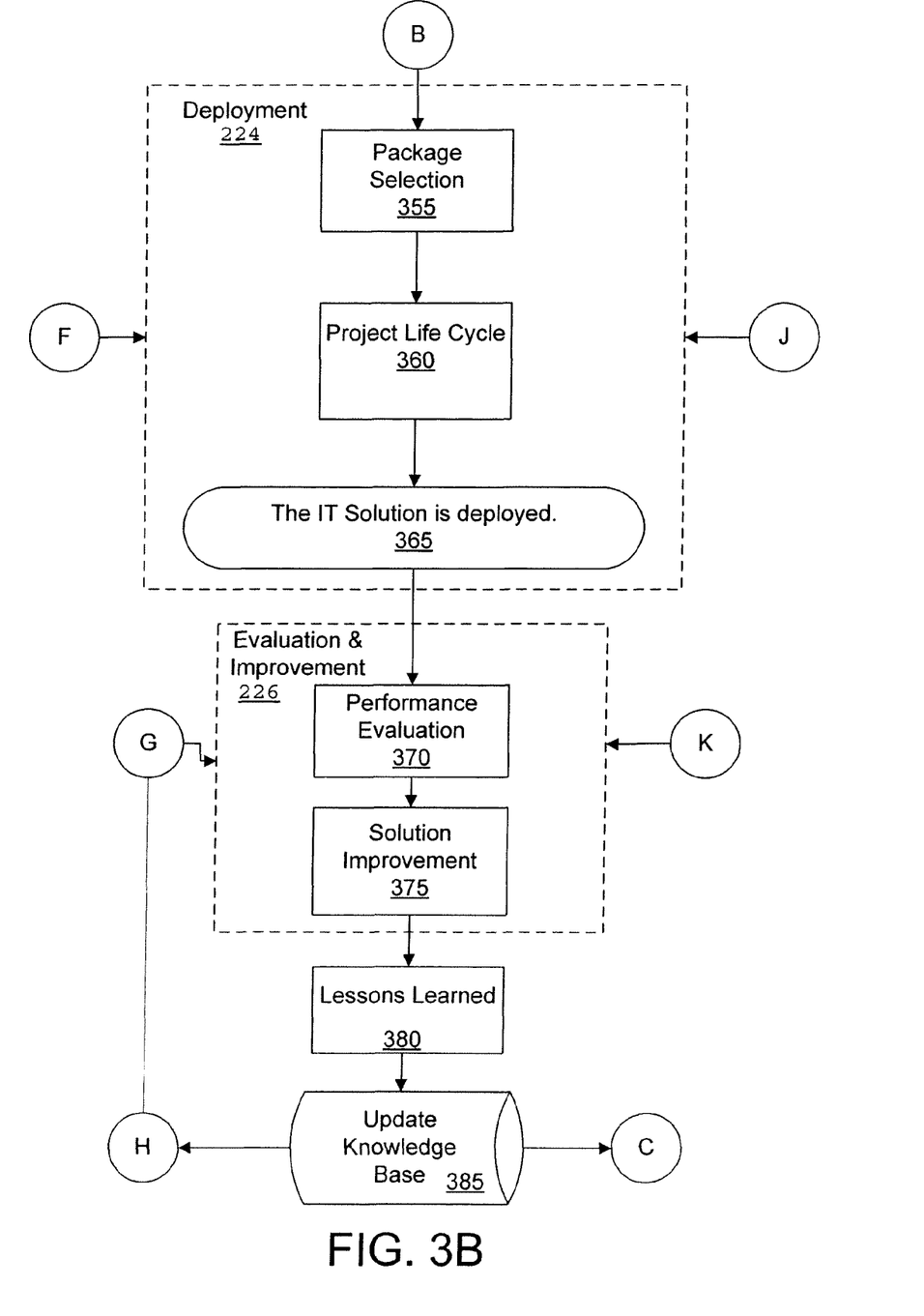

FIGS. 3A and 3B show an exemplary flow for performing aspects of the present invention. The steps of FIGS. 3A and 3B, and all other flow diagrams, may be implemented in the environment of FIG. 1, for example. The flow diagrams may equally represent a high-level block diagram or a swim-lane diagram of the invention. The flowchart and/or block diagram in FIGS. 3A and 3B, and of other figures herein, illustrates the architecture, functionality, and operation of possible implementations of systems, methods and computer program products according to various embodiments of the present invention. In this regard, each block in the flowchart, block diagram or swim-lane diagram may represent a module, segment, or portion of code, which comprises one or more executable instructions for implementing the specified logical function(s). It should also be noted that, in some alternative implementations, the functions noted in the blocks may occur out of the order noted in the figure. Each block of each flowchart, and combinations of the flowchart illustration can be implemented by special purpose hardware-based systems that perform the specified functions or acts, or combinations of special purpose hardware and computer instructions and/or software, as described above. Moreover, the steps of the flow diagram may be implemented and executed from either a server, in a client server relationship, or they may run on a user workstation with operative information conveyed to the user workstation. In an embodiment, the software elements include firmware, resident software, microcode, etc.

In embodiments, a service provider, such as a Solution Integrator, could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

Furthermore, the invention can take the form of a computer program product accessible from a computer-usable or computer-readable medium providing program code for use by or in connection with a computer or any instruction execution system. The software and/or computer program product can be implemented in the environment of FIG. 1. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable storage medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disc-read/write (CD-R/W) and DVD. Each of the relevant steps can be implemented on the infrastructure of FIG. 1. In addition, any relevant data required for the processes as discussed herein, can be stored on the database 22B in, for example, a look up table.

FIG. 3A shows a method for IT project management. The PMM 202 falls under the operation of the project management office, which may include one or more individuals that manage IT deployment projects. The visioning module 220 alerts the user, in one embodiment the project management office, to key CSFs that are relevant to this phase of IT deployment. As indicated by tab A, those CSFs include top management support including strong leadership, commitment, and continuous support by top management, a business plan and vision wherein the IT strategic plan along provides a clear communicated business plan and vision to steer the direction of the ERP project and other IT projects; and a cost/benefit analysis for defining the success criteria for the ERP project. These CSFs are imported from CSF module 204 and displayed to the user. The visioning module 220 further alerts the user to key knowledge barriers to this phase of IT deployment.

As indicated by tab D, those knowledge barriers include economic barriers from economics barrier module 501 (FIG. 5), described in greater detail below, and are imported from knowledge barriers module 206. At step 305, the visioning module 220 prompts a user to develop a strategic vision for the organization.

Next, at step 310, the visioning module 220 prompts the user to develop a budgeting plan for the organization. In consideration of the strategic vision and the budgeting plan, the user is then prompted at step 315 to consider a strategic plan for the organization. Ultimately, the visioning module 220 elicits an IT plan from the user at step 320. This IT plan is submitted to the PMM 202 at step 325.

The matching vision module 222 alerts the user to key CSFs that are relevant to this phase of IT deployment. Relevant CSFs can be initially provided by the user, e.g., project management office, using literature or a preexisting knowledge base of the particular organization for a particular or similar project. For example, literature research can be used to determine critical success factors (CSFs) that are relevant to the organization and which may be key success factors for the particular organization. Surveys can also be prepared and analyzed to determine CSFs, for the initial IT deployment or other project for an organization. Additionally or alternatively, CSFs may be gathered from other organizations will similar issues, projects, etc. In an iterative process, as more projects are developed, the best practices and hence best CSFs can be adopted for future IT deployments or other projects, which further refines the success rate of the system. In still further embodiments, CSFs can be weighted in order to ensure the most relevant or best known CSFs provide more weight to the IT deployment or other project. The CSFs and weighting can be stored in the database 22B, for example.

As indicated by tab A, those CSFs include the same CSFs that were relevant during the visioning stage. The matching vision module 222 further alerts the user to key knowledge barriers to this phase of IT deployment. As indicated by tab E, those knowledge barriers include economic barriers from economics barrier module 501 (FIG. 5), described in greater detail below, and are imported from knowledge barriers module 206. At step 330, the matching vision module 222 prompts a user to consider an IT project proposal in view of the recorded IT plan. At step 335, the PMM 202 may accept an input from the user that the proposed IT project is in line with the recorded IT plan, and thus approved. The PMM 202 may accept an input from the user that the proposed IT project is not in line with the recorded IT plan, and thus not approved.

The PMM 202 thus prompts the user to enter explanations of the non-approval into the knowledgebase 212 at step 340. Alternatively, the PMM 202 may accept input from the user that more research about the IT project in needed, and progress regarding the IT project is halted at step 345. If the IT project is approved at step 335, then the PMM determines that the IT project is decided to be deployed and implemented at step 350.

Following tab B of FIG. 3A to tab B of FIG. 3B, FIG. 3B shows the ERP application deployment process with respect to the deployment module 224. The deployment module 224 alerts the user to key CSFs that are relevant to this phase of IT deployment. As indicated by tab F, those CSFs include package selection, selecting a project champion, teamwork, communication, project management, IT legacy systems, process management, testing, training, and vendor support. These CSFs are described in greater detail below. The deployment module 224 further alerts the user to key knowledge barriers to this phase of IT deployment. As indicated by tab J, those knowledge barriers include technical barriers from technical barrier module 503 (FIG. 5), described in greater detail below, and are imported from knowledge barriers module 206. At step 355, deployment module 224 of PMM 202 prompts the user to make an ERP package selection for deployment based on a deployment solution decision, for example. The ERP package can be developed in-house or purchased off the shelf, depending on factors such as, for example, cost benefit analysis, total cost of ownership, scope of project, return on investment, etc. Once these decisions are made, it is possible to select the appropriate ERP package.

Deployment module 224 of PMM 202 then, based on the CSFs made available and the knowledge barriers suggested, provides the user with information regarding the lifecycle of the deployment of the ERP application at step 360. At step 365, deployment module 224 of PMM 202 ultimately determines that the ERP application has been deployed, based on user input.

Evaluation and improvement module 226 of PMM 202 then begins assisting in the assessment of the ERP application deployment. The evaluation and improvement module 226 alerts the user to key CSFs that are relevant to this phase of IT deployment. As indicated by tab G, those CSFs include package establishing a multidisciplinary task force to monitor and evaluate the system and make recommendations for improvement. These CSFs are described in greater detail below. The evaluation and improvement module 226 further alerts the user to key knowledge barriers to this phase of IT deployment. As indicated by tab K, those knowledge barriers include behavioral barriers from behavioral barrier module 505 (FIG. 5), described in greater detail below, and are imported from knowledge barriers module 206. At step 370, evaluation and improvement module 226 then prompts the user to evaluate the deployment of the ERP application based on defined success criteria. The evaluation and improvement module 226 next prompts the user, at step 375, to record recommendations for improvements to the ERP application, as well as improvements to the deployment and a project management process.

At step 380, the benefits and lessons learned module 210 then prompts the user to measure the benefits realized by the project and tie them to organizational strategic goals. ERP application deployment benefits may be classified, for example, in the following categories:

Operational: cost reduction, cycle time reduction, productivity improvement, quality improvement, and customer services improvement;

Managerial: better resource management, improved decision making and planning, and performance improvement;

Strategic: supporting business growth, supporting business alliance, building business innovations, building cost leadership, generating product differentiation, and building external linkages;

IT infrastructure: involving building business flexibility, IT cost reduction, and increased IT infrastructure capability; and/or Organizational: supporting organizational changes, facilitating business learning, empowering, and building common visions.

At step 380, the benefits and lessons learned module 210 then prompts the user to enter a list of lessons learned from this project. At step 385, the list of project benefits and lessons learned are then fed into the organization knowledge base 212. The knowledge base will provide IT project information back to the organization visioning process and will be used to refine the list of CSFs and knowledge barriers for future projects.

Figure 4:
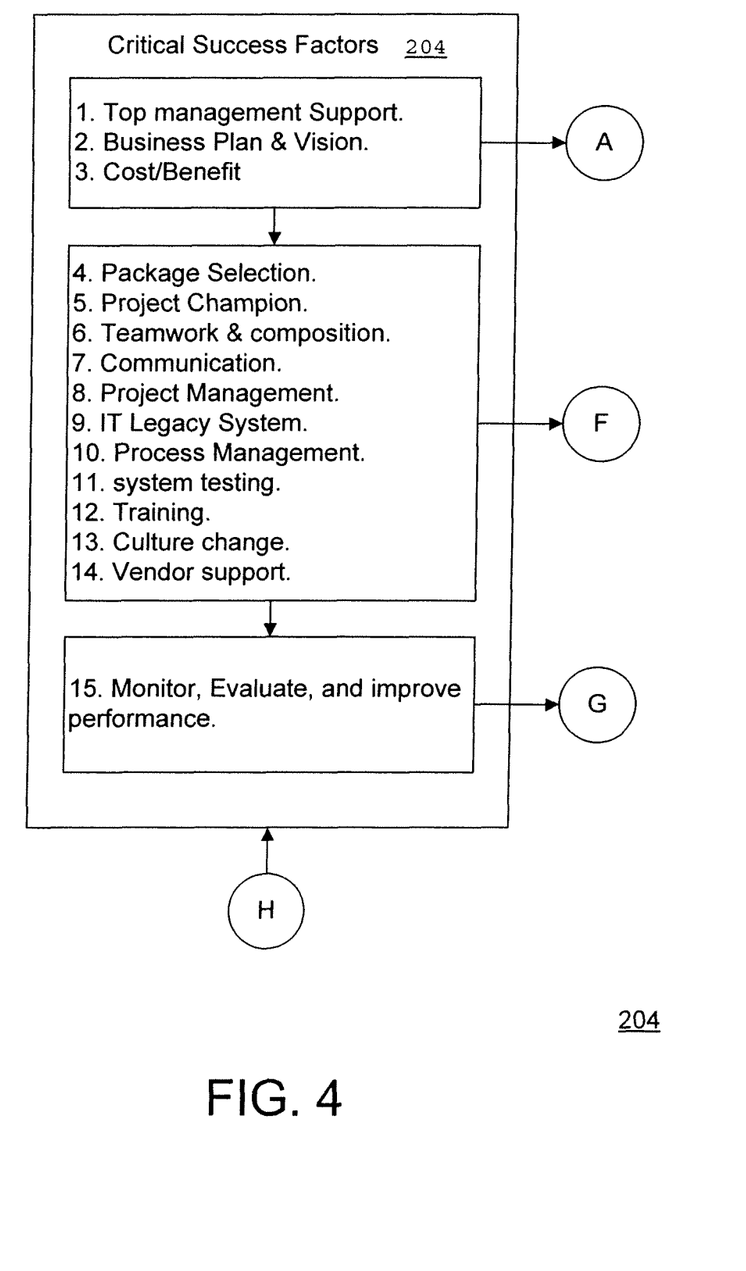
FIG. 4 illustrates a high level critical success factor component in accordance with aspects of the invention.

With reference to FIG. 4, an example CSF component 204 for an example ERP application deployment is described. The CSF component 204 collects data from the knowledge base 212 relevant to an ERP application deployment, as indicated by tab H, and provides a list of CSFs to the PMM 202. Example CSFs useful to the visioning module 220, as indicated by tab A may include but are not limited to:

Top management support: Successful deployment of IT innovation should have strong leadership, commitment, and continuous support by top management.

Business plan and vision: The IT strategic plan along with the organization's strategies should provide a clear communicated business plan and vision to steer the direction of the ERP project and other IT projects.

Cost/Benefit Analysis: In order to secure funds, this analysis would act as the basis for defining the success criteria for the ERP project.

Example CSFs useful to the evaluation and improvement module 226, as indicated by tab F, may include but are not limited to:

Package selection: The organization should make careful ERP package selections.

Project Champion: The existence of a project champion who also might be the project sponsor may aid the success of the project. The project champion should have excellent leadership skills to enable him or her to resolve conflicts and manage resistance.

Teamwork and composition: The organization should create a team to implement the ERP solution. This team should ideally be composed of three groups: functional consultants, technical consultants, and IT specialists. Organizations should consider external help if they lack skilled employees. The team members should be working full-time for the project.

Communication: The organization should have a detailed communication plan. This plan includes meeting minutes, a project newsletter, and a project homepage on the intranet.

Project management: The organization should appoint a dedicated full-time project manager. The management of the project covers the technical and functional aspects. A qualified project manager manages five main functions: managing scope, managing project team, managing quality, managing cost, and managing time.

IT legacy system: The organization should have a clear plan for migrating data from the legacy system to the new ERP application. Moreover, when the ERP application is implemented in a phased approach, interim interfaces should be developed to ensure the continuity of the existing workflow cycle.

Process management: The organization should be willing to make a decision to use the ERP project as a vehicle for change. The organization should have a clear change management strategy which includes analysis of the current business processes to identify the areas for improvement.

System testing: The organization should have a comprehensive system testing plan to test the functionality of each module alone and in conjunction with other modules.

Training: The organization should have a comprehensive training plan. The plan should include functional and technical aspects of the project. In large organizations, "train the trainer" approach is usually considered.

Culture change: The organization should process data in different languages for external use.

Vendor support: The organization should have maximum support from the vendor during the "go-live" period. The organization should also have maintenance and support contracts for the ERP application.

Example CSFs useful to the deployment module 224, as indicated by tab G, may include but are not limited to:

Evaluate and improve: The organization should establish a multidisciplinary task force to monitor and evaluate the system and make recommendations for improvement.

Figure 5:
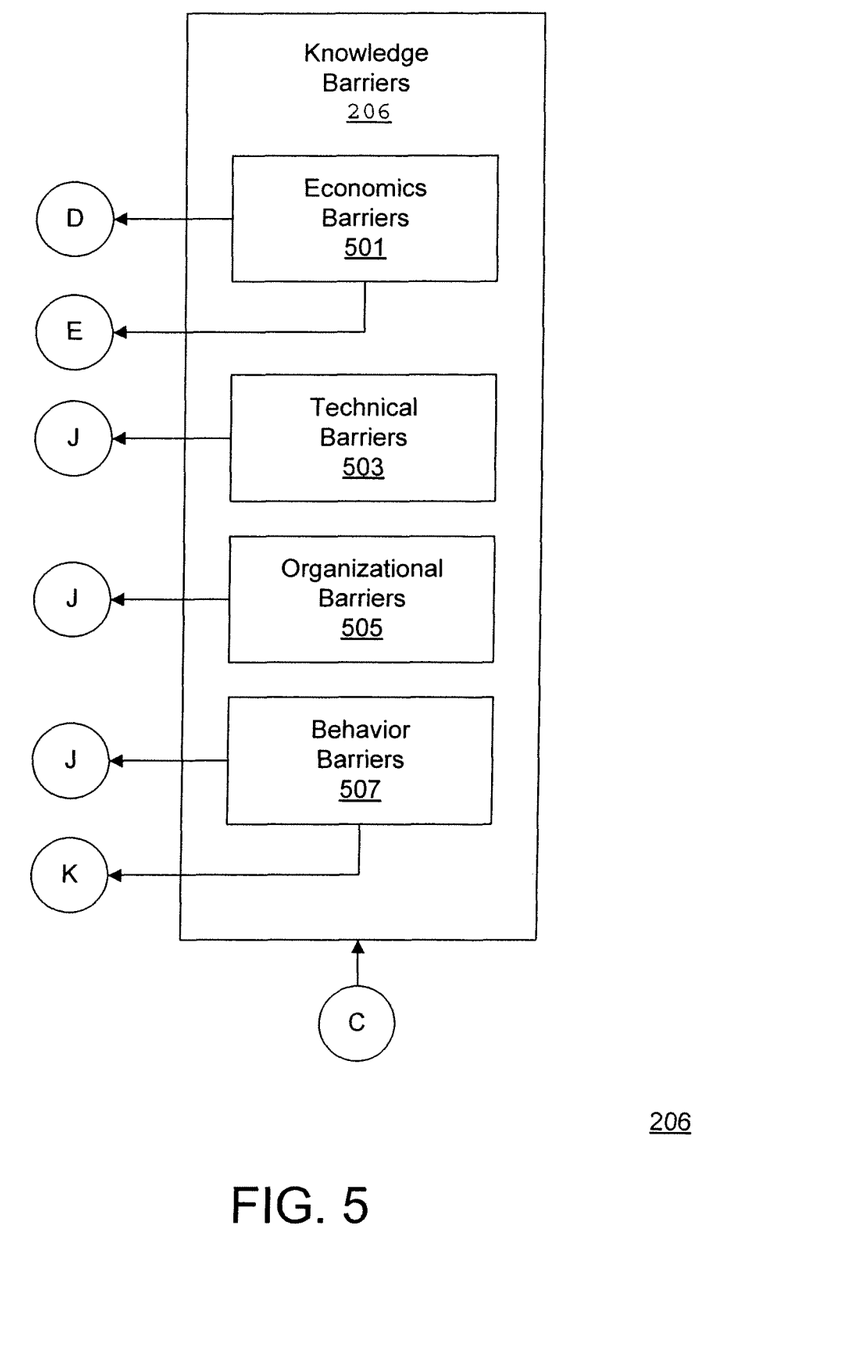
FIG. 5 illustrates a high level knowledge barrier component in accordance with aspects of the invention.

With reference to FIG. 5, an example knowledge barriers component 206 for an example ERP application deployment is described. Knowledge barriers component 206 comprises subcomponents, such as economics barriers component 501, technical barriers component 503, organizational barriers component 505, and behavioral barriers component 507, all of which input data from knowledge base 212. Economics barriers 501 elicits, records, and provides data regarding financials issues associated with acquiring and deploying a new ERP application, such as a cost/benefits analysis of the new ERP application. Economics barriers 501 provides this data to the visioning module 220, as indicated by tab D, and to the matching vision module 222, as indicated by tab E. Technical barriers component 503 elicits, records, and provides data regarding technical infrastructure, such as the need to upgrade equipment, recruit technical staff, migrate data from legacy systems, and acquire maintenance contracts for the new ERP application.

Technical barriers component 503 provides this data to the deployment module 224, as indicated by tab J. Organizational barriers component 505 elicits, records, and provides data regarding changes to management processes and practices needed to deploy and implement the new ERP application. One such example is compliance with government regulations. Organizational barriers component 505 provides this data to the deployment module 224, as indicated by tab J. Behavioral barriers component 507 elicits, records, and provides data regarding personnel training on the new ERP application, as well as resistance or compliance to new best practices associated with the new ERP application. Behavioral barriers component 507 provides this data to deployment module 224, as indicated by tab J, and to evaluation and improvement module, as indicated by tab K.

Advantages of embodiments of the present invention include strategic alignment of projects which bear on the synergy created by the management of relations between projects, and the ability to develop a better understanding of the challenges faced in carrying out information systems projects, the factors for success, and the strategies required to take advantage of IT. The acts of sharing are helpful a project's knowledge would have much less impact on the organization without making this information available to other projects. Organizations can now be aware of the repeated knowledge barriers to innovation adoption and are apprised of a well defined plan to address these barrier. Moreover, the knowledge base helps these organizations refine their strategies and prioritized plans.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims, if applicable, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principals of the invention and the practical application, and to enable others of ordinary skill in the art to understand the invention for various embodiments with various modifications as are suited to the particular use contemplated. Accordingly, while the invention has been described in terms of embodiments, those of skill in the art will recognize that the invention can be practiced with modifications and in the spirit and scope of the appended claims.

What is claimed is:

1. A method for managing a deployment project of an information technology (IT) solution which is implemented in a computer infrastructure having computer executable code tangibly embodied on a computer readable storage medium having programming instructions that:

identify and prioritize organizational problems and opportunities that form a basis for a project;

determine a set of critical success factors (CSFs) relevant to the project using data from a project management knowledge base;

determine a set of knowledge barriers relevant to the project using data from the project management knowledge base;

automatically select and aggregate, by at least one processor, a subset of CSFs and knowledge barriers relevant to a current project based on a comparison of the subset of CSFs and knowledge barriers to the current project;

generate, by the at least one processor, a project management report for the current project including the subset of CSFs and knowledge barriers that are relevant to the current project;

output the project management report to a user during a lifecycle of the project;

accept input from the user that the project is not approved;

alert a user to CSFs and knowledge barriers that are relevant to a phase of the project; and provide the user with information regarding the lifecycle of the project based on the CSFs and knowledge barriers provided to the user, wherein:

the lifecycle of the project includes a visioning phase, a vision matching phase, a deployment phase, and an evaluation and improvement phase;

the knowledge barriers include technical barriers, organizational barriers, and behavioral barriers, wherein:

the technical barriers are provided to the user during the deployment phase, and include a need to upgrade equipment, recruit technical staff, migrate data from legacy systems, and acquire maintenance contracts;

the behavioral barriers are provided to the user during the evaluation and improvement phase, and include personnel training on the project, resistance to new best practices associated with the project, and compliance to the new best practices associated with the project; and the organizational barriers include changes to management processes and practices needed to deploy and implement the project.

2. The method of claim 1, wherein the CSFs and knowledge barriers are provided to the user in a feedback loop.

3. The method of claim 1, further comprising managing the lifecycle of the project.

4. The method of claim 3, wherein managing the lifecycle of the project includes matching an IT solution to an organizational vision.

5. The method of claim 4, wherein managing the lifecycle of the project further includes deploying the IT solution.

6. The method of claim 5, wherein managing the lifecycle of the project further includes evaluating the deployment and recording suggested improvements.

7. The method of claim 6, wherein managing the lifecycle of the project further includes recording evaluation data in a knowledge base to inform CSFs and knowledge barriers for a future project.

8. The method of claim 1, wherein the project is an Enterprise Resource Planning (ERP) application deployment project.

9. The method of claim 1, wherein the input is an explanation of non-approval.

10. The method of claim 1, further comprising accepting input from the user that more research about the project is necessary.

11. The method of claim 1, wherein the programming instructions are further configured to apprise the user of critical milestones in completing the project and potential issues that should be considered in implementing the project.

12. The method of claim 1, wherein:

the CSFs for the vision and vision matching phases include at least one of: top management support, a business plan and vision, and a cost-benefit analysis;

the CSFs for the deployment phase include package selection, selecting a project champion, teamwork, communication, project management, IT legacy systems, process management, testing, training, and vendor support; and the CSFs for the evaluation and improvement phase include a multidisciplinary task force to monitor and evaluate the system and make recommendations for improvement.

13. A computer program product comprising a non-transitory computer usable storage medium having readable program code embodied in the storage medium, the program code when executed on a computing device causes the computing device to:

identify and prioritize one or more organizational problems and opportunities that form a basis for a need to acquire an informational technology (IT) solution deployment;

determine whether the IT solution deployment at least partially solves the one or more organizational problems;

accept as an input a set of critical success factors (CSFs) relevant to the IT solution deployment using data from a knowledge base;

accept as an input a set of knowledge barriers relevant to the IT solution deployment using data from a knowledge base;

automatically select and aggregate a subset of CSFs and knowledge barriers based on a comparison of the subset of CSFs and knowledge barriers to the IT solution deployment;

generate a project management report for the IT solution deployment including the subset of CSFs and knowledge barriers that are relevant to the IT solution deployment;

output the project management report to a user during a lifecycle of the IT solution deployment; and alert a user to key CSFs and key knowledge barriers that are relevant to phases of the IT solution deployment, wherein:

the lifecycle of the IT solution deployment includes a visioning phase, a vision matching phase, a deployment phase, and an evaluation and improvement phase;

the knowledge barriers include:

technical barriers which are provided to the user during the deployment phase, and include at least one of a need to: upgrade equipment, recruit technical staff, migrate data from legacy systems, and acquire maintenance contracts;

behavioral barriers which are provided to the user during the evaluation and improvement phase, and include at least one of: personnel training on the project, resistance to new best practices associated with the project, and compliance to the new best practices associated with the project; and organizational barriers which include at least one of: changes to management processes and practices needed to deploy and implement the project.

14. The computer program product of claim 13, wherein the CSFs and knowledge barriers are provided to the user in a feedback loop.

15. The computer program product of claim 13, further comprising managing the lifecycle of the IT solution deployment.

16. The computer program product of claim 15, wherein managing the lifecycle of the IT solution deployment includes matching an IT solution to an organizational vision.

17. The computer program product of claim 16, wherein managing the lifecycle of the IT solution deployment further includes deploying the IT solution.

18. The computer program product of claim 17, wherein managing the lifecycle of the IT solution deployment further includes evaluating the deployment and recording suggested improvements.

19. The computer program product of claim 18, wherein managing the lifecycle of the IT solution deployment further includes recording evaluation data in a knowledge base to inform CSFs and knowledge barriers for a future project.

20. The computer program product of claim 13, wherein the IT solution deployment is an ERP application deployment project.

21. The computer program product of claim 13, wherein the program code further causes the computing device to provide the user with information regarding the lifecycle of the IT solution deployment based on the CSFs and knowledge barriers provided to the user.

22. A computer system for providing a project management program, the system comprising:
a processor, a computer readable memory, and a computer readable storage media;
first program instructions to elicit from a user a set of critical success factors (CSFs) relevant to a project and record the CSFs in a project management knowledge base;
second program instructions to elicit from a user a set of knowledge barriers relevant to the project using data and record the knowledge barriers in project management knowledge base;
third program instructions to automatically select and aggregate a subset of CSFs and knowledge barriers relevant to a current project based on a comparison of the subset of CSFs and knowledge barriers to the current project;
fourth program instructions to generate a project management report including the subset of CSFs and knowledge barriers that are relevant to the current project; and
fifth program instructions to output the project management report to a user during a lifecycle of the current project;
sixth program instructions to identify and prioritize one or more organizational problems and opportunities that form a basis for an informational technology (IT) project;
seventh program instructions to determine whether the IT project at least partially solves the one or more organizational problems;
eight program instructions to alert the user to key CSFs and knowledge barriers that are relevant to a phase of the IT project;
wherein the project management knowledge base comprises data entered during at least one previous project;
wherein the first, second, third, fourth, fifth program, sixth, seventh, and eighth program instructions are stored on the computer readable storage media for execution by the processor via the computer readable memory; and
wherein the knowledge barriers include:
technical barriers which are provided to the user during a deployment phase, and include a need to upgrade equipment, recruit technical staff, migrate data from legacy systems, and acquire maintenance contracts;
organizational barriers which include changes to management processes and practices needed to deploy and implement the project; and
behavioral barriers which are provided to the user during an evaluation and improvement phase, and include personnel training on the project, resistance to new best practices associated with the project, and compliance to the new best practices associated with the project.

23. The computer system of claim 22, wherein the lifecycle of the project includes:
matching an IT solution to an organizational vision;
deploying the IT solution; and
evaluating and improving the IT solution.

24. The computer system of claim 23, wherein the lifecycle of the project further includes updating a knowledge base to inform CSFs and knowledge barriers of a future project.

25. The computer system of claim 22, wherein the project is an ERP application deployment.

26. The computer system of claim 22, further comprising program instructions to apprise the user of potential issues that should be considered in implementing the IT project.

27. The computer system of claim 26, wherein:
the CSFs for vision and vision matching phases include top management support, a business plan and vision, and a cost-benefit analysis;
the CSFs for the deployment phase include package selection, selecting a project champion, teamwork, communication, project management, IT legacy systems, process management, testing, training, and vendor support; and
the CSFs for the evaluation and improvement phase include a multidisciplinary task force to monitor and evaluate the system and make recommendations for improvement.

* * * * *